No. 777,376. PATENTED DEC. 13, 1904.
W. T. JAMES.
CONVEYER.
APPLICATION FILED OCT. 14, 1903.
NO MODEL. 3 SHEETS—SHEET 1.
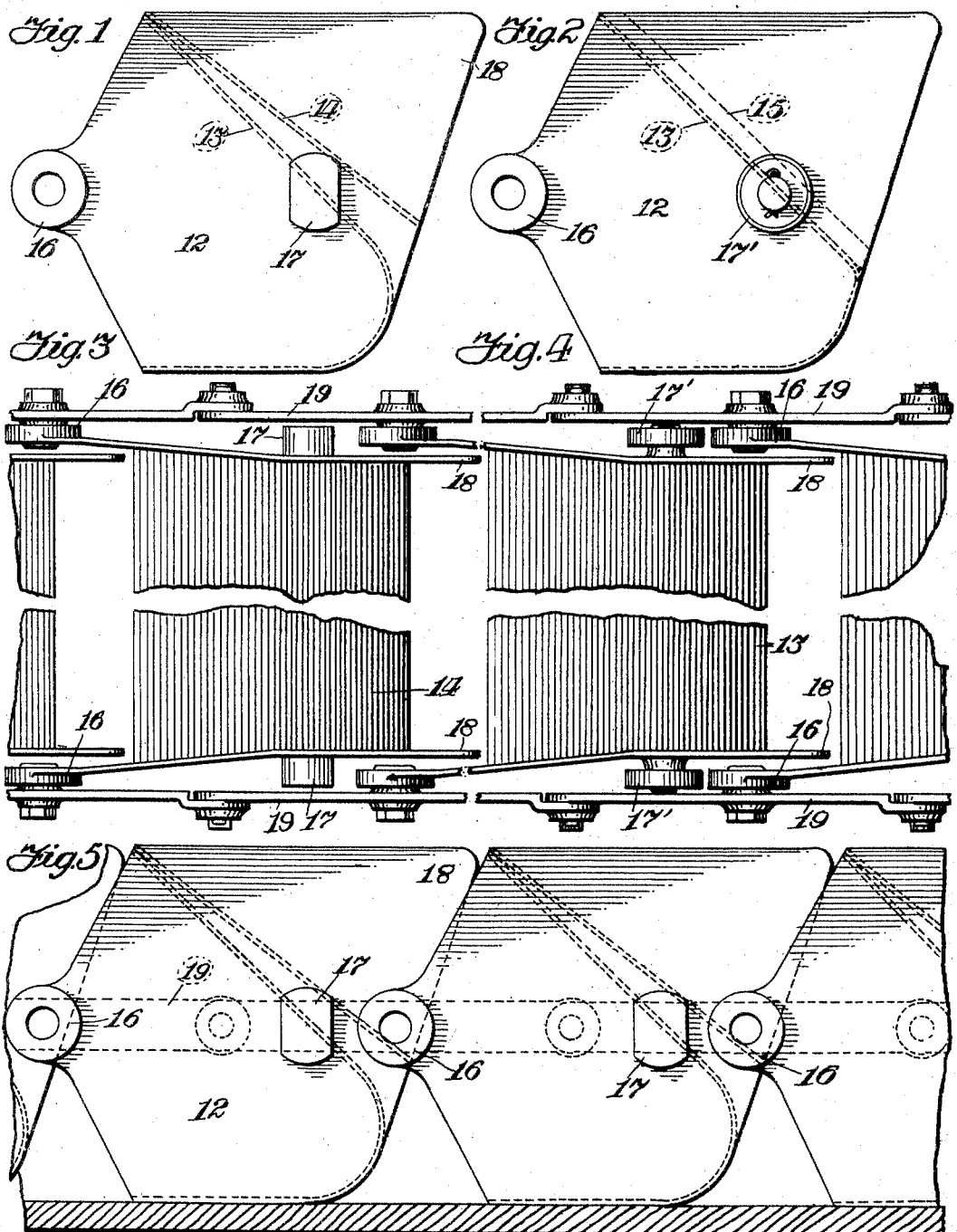

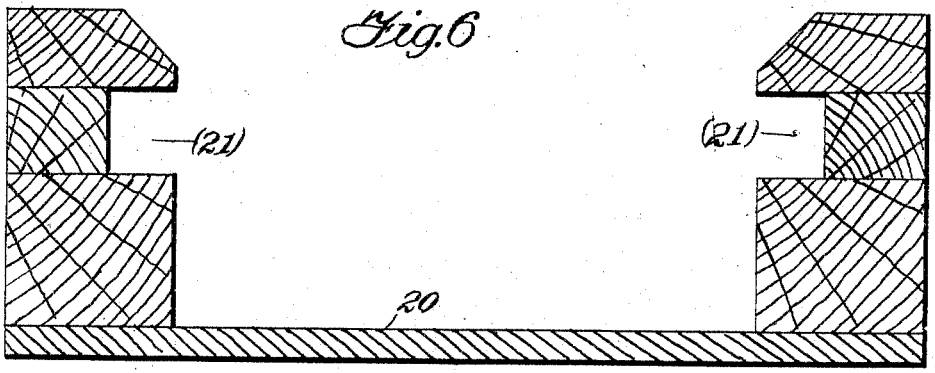
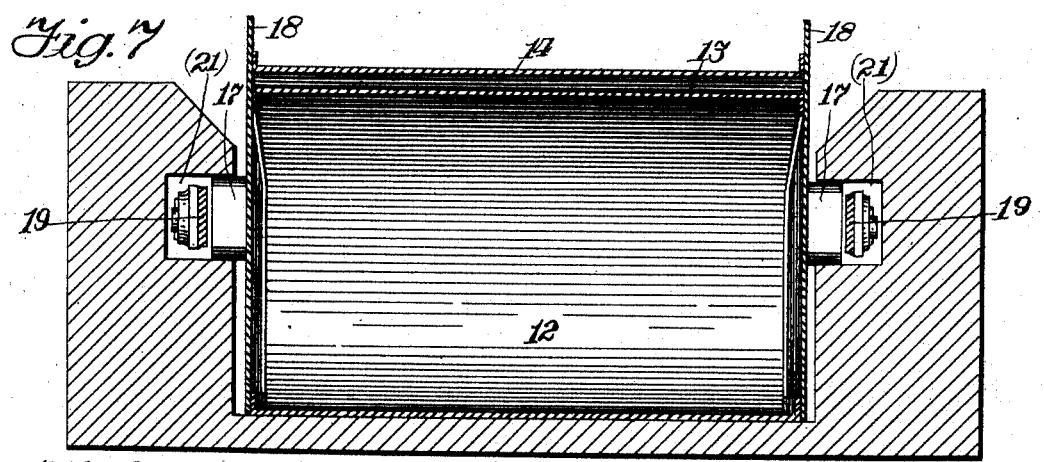
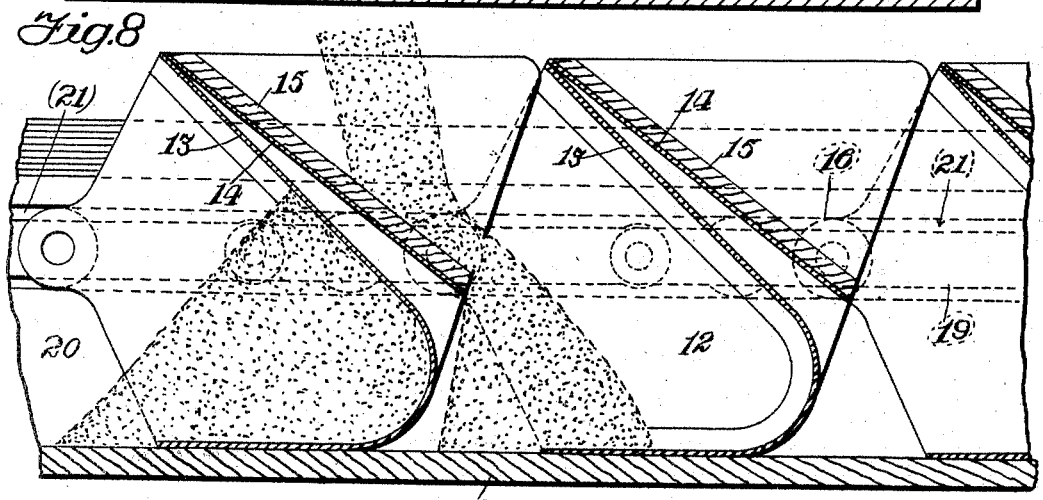

No. 777,376. PATENTED DEC. 13, 1904.
W. T. JAMES.
CONVEYER.
APPLICATION FILED OCT. 14, 1903.
NO MODEL. 3 SHEETS—SHEET 3.
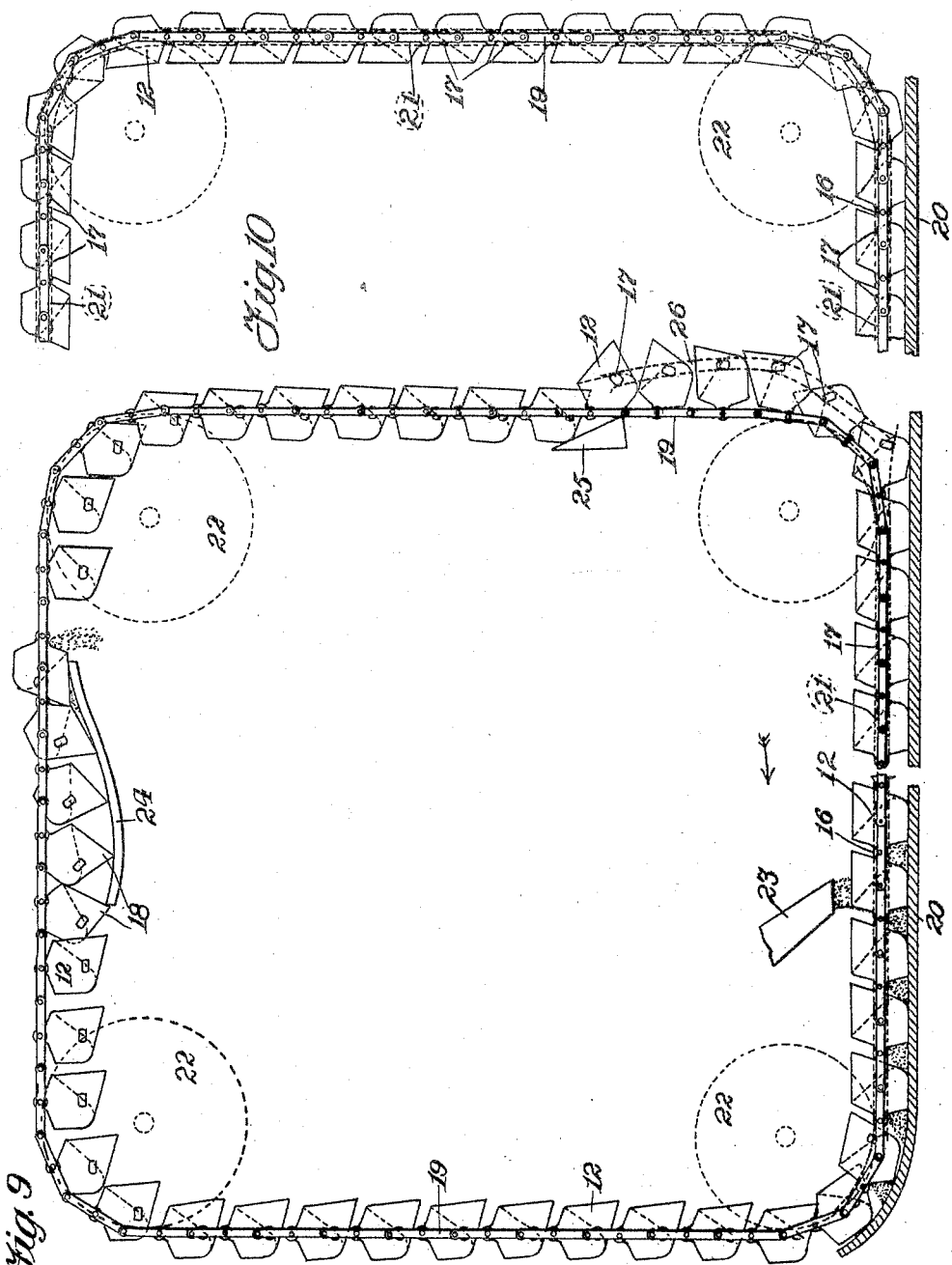
Witness:
F. W. H. Clay
Chas. H. Eberh
Inventor,
William T. James
By Paul Synnestvedt
Att'y.

No. 777,376.  Patented December 13, 1904.

UNITED STATES PATENT OFFICE.

WILLIAM T. JAMES, OF CHICAGO, ILLINOIS.

CONVEYER.

SPECIFICATION forming part of Letters Patent No. 777,376, dated December 13, 1904.

Application filed October 14, 1903. Serial No. 177,089. (No model.)

*To all whom it may concern:*

Be it known that I, WILLIAM T. JAMES, a citizen of the United States, residing at Chicago, in the State of Illinois, have invented certain new and useful Improvements in Conveyers, of which the following is a specification.

My invention relates to conveying apparatus for carrying loose material such as coal, grain and the like, and to other improvements in the conveyer receptacle itself, adaptable to any other form of conveyer. The objects of the invention are, to provide a series of conveyer receptacles which are adapted to be swung pivotally upon their supports in order to pass easily around the sprockets leading to the upper run and to be held in position for self loading on the lower run; to so design a series of buckets that they may swing partly inside of each other; to provide superior means for loading and unloading conveyers; to provide a series of conveyer buckets each of which has means for readily loading the next succeeding one, and to provide for loading the buckets in a trough on the lower run; to provide means for loading swinging buckets automatically, and for dumping the same, and to generally improve the structure and operation of chain conveyers.

The above objects, together with other advantages which will hereinafter appear, I attain by means of the construction illustrated in preferred forms in the accompanying drawings, wherein—

Figure 1 is a side elevation of one form of the bucket;

Figure 2 is a side elevation of a bucket having as indicated in dotted lines, a different form of partition between the sides and the different means for supporting the bucket in position;

Figure 3 is a partial plan view of a conveyer chain with the bucket of Figure 1 fixed therein;

Figure 4 is a similar view showing the bucket of Figure 2 therein;

Figure 5 is a side elevation of a series of buckets showing their position in the loading trough;

Figure 6 illustrates a convenient construction of loading trough for the conveyer;

Figure 7 is a cross section through the trough and the bucket placed therein;

Figure 8 is a longitudinal section through a series of buckets and the trough, illustrating the mode of loading the buckets.

Figure 9 is a view in diagram illustrating the mode of connecting the buckets together into a chain conveyer and illustrating also the means for loading and the means for dumping the same and showing one form of apparatus for adjusting the position of the buckets as they enter the lower run; and Figure 10 is a partial view illustrating another means of inverting the buckets for loading on the lower run.

In order to avoid the necessity for dumping the conveyer buckets immediately upon their entry upon the upper run, and to make an easy and convenient means for rounding the sprocket wheel leading to the upper run, I prefer to mount the buckets in swinging fashion upon the conveyer chains; and in order that the buckets may be placed close together and still swing clear of each other I form the bucket with the bottom narrower than the top thereof, so that each bucket may swing partially inside the next if desired. The apparatus as illustrated is designed to be loaded upon the lower run by passing through a trough and the material being poured in a constant stream upon the progressing line of buckets as indicated in Figure 8. In Figure 1 I have illustrated a form of bucket, 12, which is provided with a pivoting hub 16 on the top of the body, and with a partition 13 between the two sides to form the bottom and front of the bucket. This front, 13, is made slanting so that the contents may be easily dumped, and back of the same I form a chute by extending the sides 12 backward in the shape of wings 18 between which I may provide a separate partition 14 to form the bottom of the chute on the back, so that each of the buckets directs the material into the next succeeding bucket, as will be understood from Figure 8.

In Figure 2 I have illustrated a form of bucket which is essentially the same in general configuration but the two partitions are replaced by single partition 13, and I have indicated in dotted lines a wooden or fiber or other non-metallic lining 15, to deaden the sound of material falling upon the chute. Also in place of the laterally projecting stud 17 shown in Figure 1, whose purpose will be hereafter described, I have in this case provided a small wheel 17' which is fixed upon a stud on the side of the bucket and may be when desired provided with rubber tires to lessen the noise of the running of the same in the guides and on the track. It will be seen from Figures 3 and 4 that the buckets are mounted by pivoting the hubs 16 directly to the chain 19, which I preferably do between the joints of the chain; and the bucket is attached to the chain only at this pivoting point, while the rear end of the bucket swings free both of the chain and the next succeeding bucket. Each bucket is provided either with the solid studs 17 or with the wheels 17' in order that in passing through the lower run the hubs 16 and the stud or wheels may engage a slot 21 in the side of the trough 20, as illustrated in Figure 7.

Referring to Figure 9 it will be seen that I place a series of these buckets upon a chain and the chain is guided around the sprocket wheels 22, which may be of any preferred form as in customary construction. Along the lower run the buckets are passed through a trough 20 and are held securely in horizontal position by the engagement of the hubs 16 and the wheels 17' or studs 17 respectively with the slot 21 in the guide ways on sides of the trough, from which arrangement it will be evident that the bucket will be held in horizontal position and the lower side which presents its edge in the direction of movement of the bucket will scrape along the bottom of the same and gather up the material which may be discharged into the trough and the buckets by means of a chute 23, as will be seen in said Figure 9. The chain of buckets 12 are passed over the upper sprocket wheel 22 and it will be observed that they hang by their pivots so as to remain substantially vertical until they reach the position at which it is desired to dump them, when some such means as the slanting trip bar 24 engages the projecting side flanges 18 of the buckets and dumps them, the inclined position of the side 13 in front of the bucket very much facilitating the dumping of the material without endangering the bucket turning upside down. After passing the dumping device 24 the buckets may either be allowed to swing vertically and return to a position near the sprocket wheel of the lower run, or they may be held horizontal immediately after dumping and be guided in inverted position as they come down on the vertical side to approach the lower run again, as illustrated in Figure 10, where the dotted lines 21 indicate a slot in a guide bar, as will be clearly understood. In the arrangement of Figure 9 the buckets may be inverted as they approach the lower run in any desired manner, such as by striking the inclined block 25 and having the lugs or rolls 17 engage a slot 26 arranged in a convenient guide bar, so as to invert the same and bring them upon the lower run in the horizontal position indicated in said figure.

It will be observed that in the passage of the buckets along the trough forming the lower run in loading of the same, the chain passes freely through the slot 21 while the rollers 17' may engage the top and bottom of the slot 21 and hold the bucket firmly in the position desired in order that the edge may scrape along the bottom and load the bucket. It will also be seen that in discharging the material from the chute 23 it falls directly upon the wooden covered bottoms of the chutes formed by the side flanges 18 and partitions 14 or the back of each bucket and each one thereby directs the material into the next succeeding bucket so that there may be practically no necessity for scraping up the material from the bottom of the trough itself, the discharge being directly into each bucket as it proceeds. Besides the wings 18 forming the loading chute on each bucket they also serve in the dumping operation to allow of tipping the bucket readily without turning it too high in a vertical position, which operation is also facilitated by the sloping form of the partitions 13 forming the front of the bucket. The chains carrying the bucket may be of any desired form and the links may be of any length desired, this not being an essential feature of the present invention. It will be observed that the entire operation of loading and dumping the buckets and righting them up again for entry upon the lower run is automatic, and that the design of the buckets is such that they may be placed very close together and may be handled with great accuracy, and that the loading is very economical and does away with much of the friction ordinarily found in the case of buckets loading from a trough. Other advantages of the device will readily occur to those familiar with the art.

Having thus described my invention and illustrated its use, what I claim as new, and desire to secure by Letters Patent, is the following:

1. In a conveyer, a bucket pivotally mounted to hang freely in its supports in all other positions, but adapted to lie on the front side in the lower run, and means for pivotally holding it in position to act as a drag for self-filling in the lower run.

2. In a conveyer, a series of buckets pivotally mounted to freely revolve in their supports, each bucket having a loading chute on its back extending into the mouth of the next succeeding bucket and means to hold the buckets in position to act as a drag in the lower run, so that the buckets are self-loading, substantially as described.

3. A conveyer bucket provided with extended side flanges and a sloping back side forming a chute on the back of the same, said chute being covered with non-metallic material.

4. A series of pivoted conveyer buckets mounted to freely revolve on their pivots, each bucket swinging between the supporting pivots of the next succeeding bucket and each provided on its back with a loading chute, substantially as described.

5. A bucket comprising vertical side plates with projecting flanges, a front parallel to the line of drag in loading position and an inclined back forming with the flanges a loading chute for the next succeeding bucket.

6. A conveyer bucket comprising converging sides, a vertical front and an inclined back, and provided on the back with a chute lined with soft material, substantially as described.

7. The combination with suitable conveyer chains and a loading trough having guide slots in its sides, of a conveyer bucket pivoted to and swinging freely between the chains, and having projections on its sides to engage the slots in the trough, whereby the bucket is positively held in position in the trough to act as a drag for self-loading.

8. In conveyers, the combination with a loading trough having guide slots in its sides, of a bucket pivoted to swing freely through the conveyer chain, said bucket being provided on the side with two projections to engage the guide slots and hold the bucket positively in position to act as a drag in said trough.

9. In a conveyer, the combination with a pair of conveyer chains and a loading trough on the lower run having guide slots, of a conveyer bucket pivoted to swing freely through the chains in all positions and provided with means to hold it in fixed horizontal position in said slotted trough for loading.

10. A swinging conveyer bucket provided with two pairs of projections fixed on the sides thereof, in combination with a guiding slot to hold the buckets in rigid position in the lower run, to act as drags therein.

11. The combination of a loading trough having guide slots in its sides, a pair of conveyer chains, a series of buckets pivoted in the chains, each bucket having a projection to engage the slot and the pivot connecting the bucket to the chain also adapted to engage the slot, whereby the bucket is supported at two points in position in the trough to act as a drag for filling.

12. The combination with conveyer chains and a loading trough having slotted sides, of a bucket pivoted in the chains so as to revolve entirely around the pivots, engaging means on the bucket to hold it in the trough and an inclined chute on the back of the bucket.

13. A series of conveyer buckets mounted in their pivotal supports so as to be capable of entire revolution thereon between the chains, and each bucket provided with an inclined loading chute on its back, whereby each bucket feeds material into the next succeeding one when the buckets are held in loading position.

In testimony whereof I have hereunder signed my name in the presence of the two subscribed witnesses.

WILLIAM T. JAMES.

Witnesses:
 PAUL CARPENTER,
 EDWARD C. BURNS.